(12) United States Patent
Nonnweiler et al.

(10) Patent No.: US 8,523,731 B2
(45) Date of Patent: Sep. 3, 2013

(54) WELDED COMPONENT, IN PARTICULAR PLANET WHEEL CARRIER, METHOD FOR PRODUCING THE COMPONENT AND APPARATUS FOR CARRYING OUT THE METHOD

(75) Inventors: Werner Nonnweiler, Saarbrucken (DE); Jorg Brockstieger, Kleinblittersdorf (DE); Ralf Morlo, Saarbruecken (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 19 days.

(21) Appl. No.: 13/377,584

(22) PCT Filed: Jun. 1, 2010

(86) PCT No.: PCT/EP2010/057597
§ 371 (c)(1),
(2), (4) Date: Dec. 12, 2011

(87) PCT Pub. No.: WO2010/149472
PCT Pub. Date: Dec. 29, 2010

(65) Prior Publication Data
US 2012/0088119 A1    Apr. 12, 2012

(30) Foreign Application Priority Data

Jun. 22, 2009 (DE) .......................... 10 2009 027 066

(51) Int. Cl.
*F16H 57/08* (2006.01)
(52) U.S. Cl.
USPC ............................................ 475/331; 74/640

(58) Field of Classification Search
USPC ................ 475/220, 248, 331; 74/640, 606 R
See application file for complete search history.

(56) References Cited

U.S. PATENT DOCUMENTS

| 3,012,130 | A | * | 12/1961 | Harrison ........................ 228/186 |
| 3,058,211 | A | * | 10/1962 | Axtell .............................. 29/509 |
| 4,043,021 | A | * | 8/1977 | Mosbacher et al. ............ 29/437 |
| 5,480,362 | A | | 1/1996 | Tanaka et al. |
| 5,580,636 | A | * | 12/1996 | Kampmann et al. .......... 428/119 |
| 5,658,215 | A | * | 8/1997 | Premiski et al. ............... 475/331 |
| 6,261,701 | B1 | * | 7/2001 | Fields, Jr. ....................... 428/577 |
| 2004/0235610 | A1 | | 11/2004 | Jang et al. |

FOREIGN PATENT DOCUMENTS

| DE | 26 05 227 A1 | 11/1976 |
| DE | 35 42 622 A1 | 3/1985 |
| DE | 19 912 719 A1 | 9/2000 |
| DE | 103 61 701 A1 | 8/2005 |
| FR | 2 299 566 | 12/1975 |
| GB | 1 479 414 | 7/1977 |
| JP | 6 081 907 A | 3/1994 |
| JP | 10 068 450 A | 3/1998 |
| JP | 10 288 248 A1 | 10/1998 |

* cited by examiner

*Primary Examiner* — Justin Holmes
(74) *Attorney, Agent, or Firm* — Davis & Bujold, PLLC

(57) ABSTRACT

A welded component comprising two sheet metal components (51, 53) joined by at least one weld seam (55). A first sheet metal component (51) is disk-shaped and a second sheet metal component (53) is pot-shaped, and at least one of the two sheet metal components (51, 53) has a sheet thickness (s). One (51) of the two sheet metal components (51, 53) has a larger sheet thickness (S>s) in an area of the at least one weld seam (55).

15 Claims, 8 Drawing Sheets

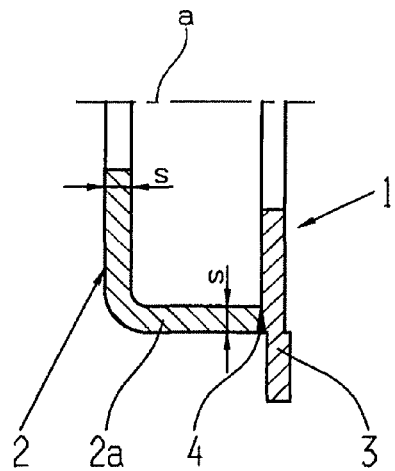
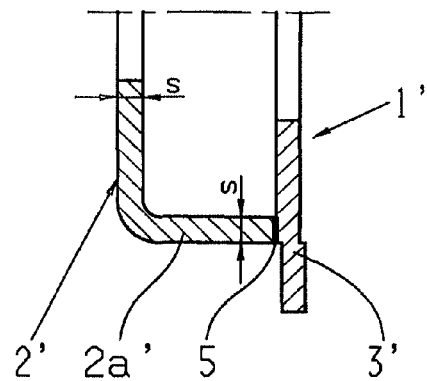
Fig. 1 (Prior Art)
Fig. 2 (Prior Art)
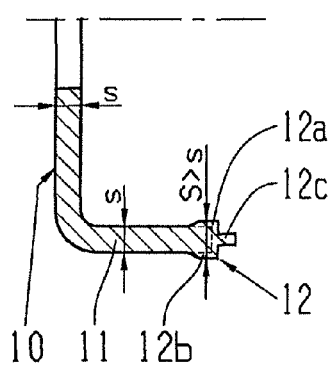
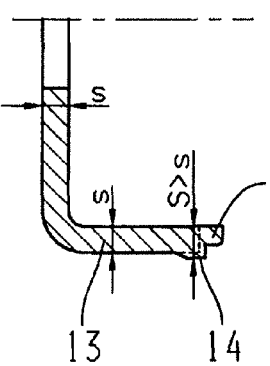
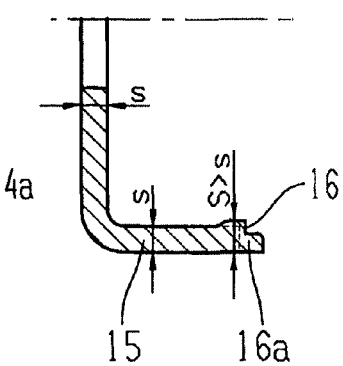
Fig. 3
Fig. 4
Fig. 5

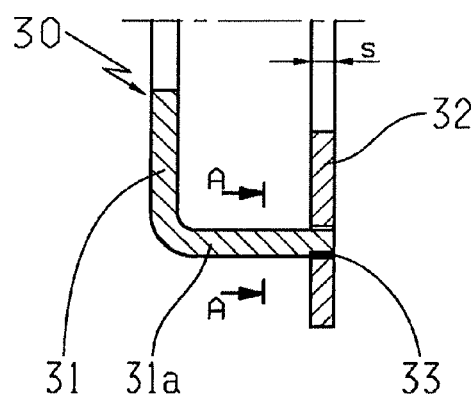
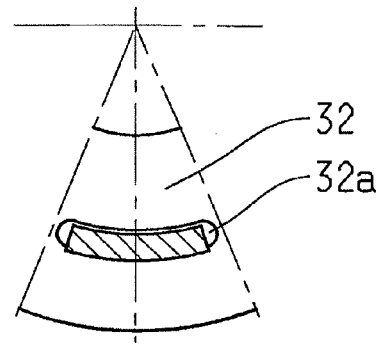
Fig. 9　　　　　Fig. 9a
(Prior Art)　　　(Prior Art)
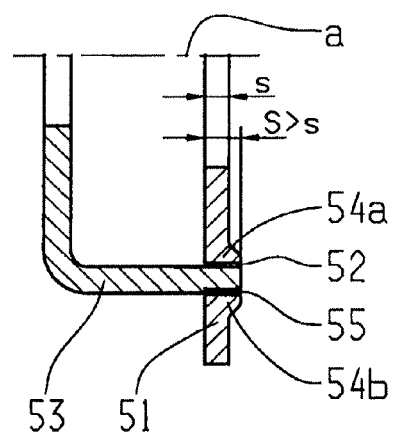
Fig. 14

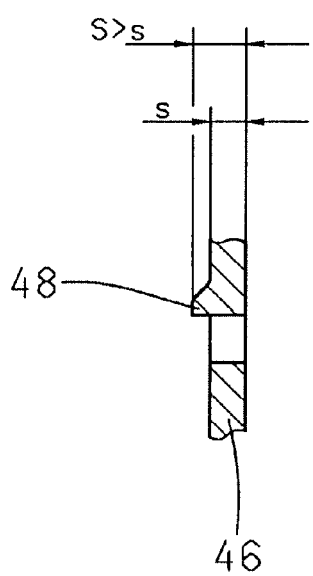
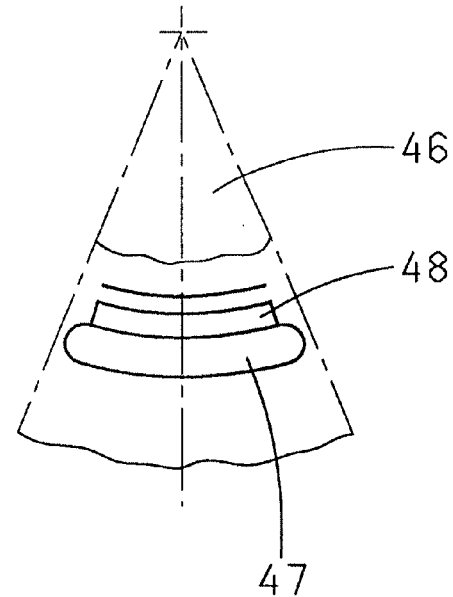
Fig. 19    Fig. 19a
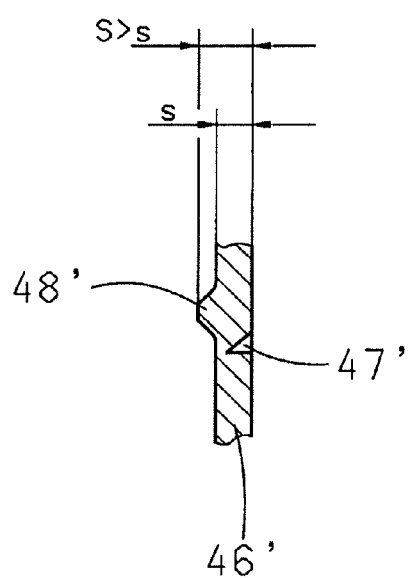
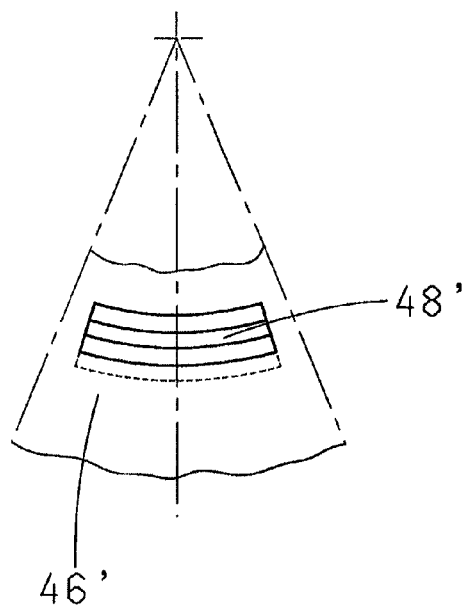
Fig. 20    Fig. 20a

WELDED COMPONENT, IN PARTICULAR PLANET WHEEL CARRIER, METHOD FOR PRODUCING THE COMPONENT AND APPARATUS FOR CARRYING OUT THE METHOD

This application is a national stage completion of PCT/EP2010/057597 filed Jun. 1, 2010 which claims priority from German Application Serial No. 10 2009 027 066.3 filed Jun. 22, 2009.

FIELD OF THE INVENTION

The invention concerns a welded component, a method for producing the component, a device for implementing the method, and finally, a production method.

BACKGROUND OF THE INVENTION

It is known to join together sheet metal components of different design but with equal sheet thickness, by welding. With a first sheet metal component of cup-shaped design and a second, disk-shaped sheet metal component, the weld connection can be formed in various possible ways, for example with a radial weld seam that extends in the radial direction or with an axial weld seam that extends in the axial direction. Known welding methods for such joints are laser beam welding, electron beam welding or condenser-discharge welding. In each case the length and depth of the weld seam determine the size of the forces that can be transferred. And the depth of the weld seam depends on the sheet metal thickness, i.e. the weld seam cannot be longer than the thickness of the sheet.

Welded components of this type are for example planetary wheel carriers, also called planetary carriers for short, as used in rotary or planetary transmissions. In these a first sheet metal component in the form of a web is joined to a second sheet metal component in the form of a guide disk.

From DE 35 42 622 A1 a welded planetary carrier for a motor vehicle transmission is known, the web and the guide disk being connected to one another by condenser-discharge welding. In this case the joint is formed as a fillet weld.

From DE 103 61 701 B4 a planetary carrier for an automatic transmission is known, the parts of the planetary carrier being connected to one another by brazing.

From DE 26 05 227 A by the present applicant a planetary carrier is known, in which the two parts of the planetary carrier, namely two side-disks with web attachments, are joined to one another by a circular weld seam arranged centrally in relation to an axial direction. By positioning the weld seam toward the middle of the webs, the weld sites are located in a zone of lower stresses, i.e. the weld joint can withstand higher loads.

From DE 199 12 719 A1 a planetary carrier consisting of two carrier disks with web sections is known, the two carrier disks being connected to one another by a weld seam in the axially central area of the webs, i.e. in an area of lower loading. The weld seam is formed as a radial weld seam and its radial extension corresponds to the wall thickness of the web sections in contact with one another.

SUMMARY OF THE INVENTION

The purpose of the present invention is to provide a weld joint in a welded component of the type mentioned at the start, which withstands higher loads without substantially increasing the weight of the component, its moment of inertia and its structural volume. A further objective of the invention is to provide a suitable and advantageous method for producing the welded component and a suitable and advantageous device for implementing the production method.

According to the invention, for a welded component, in particular a welded planetary carrier, it is provided that in the area of the weld seam or weld seams one of the two sheet metal components has a larger sheet thickness. This has the advantage that a longer or deeper weld seam can be formed between the sheet components to be connected, so that the weld joint is stronger. Particularly in the case of a planetary carrier, a higher torque can then be transmitted. Since the sheet metal thickness is increased only partially, namely only in the area of the weld seam, the weight of the welded component is increased only slightly. The moment of inertia too, which is important particularly in the case of a planetary carrier, is increased only to a small extent. Analogously, the same applies to the structural volume of the welded metal component or planetary carrier.

In a preferred embodiment, the thickening is carried out by deformation of the sheet component, i.e. by a shaping process with no machining, such as compressing or displacing the sheet material. After the deformation thickening, the two parts can be welded to one another.

In other preferred embodiments the weld seam for connecting the two sheet metal components can be made both as a radial seam and as an axial seam. This allows different possible design and connection forms.

In a further preferred embodiment the component is a planetary carrier of a transmission and has as its first sheet metal component a guide disk and as its second sheet metal component a web or web star with web arms or web lobes, which are connected to the guide disk. As is known—for example, from the prior art mentioned to begin with—the planetary carrier supports planetary gears inside itself and so transmits a torque that has to be withstood by the weld seams. As a result of increasing the weld seam depth according to the invention, a larger torque can be transmitted by the planetary carrier.

In a further preferred embodiment, the sheet thickness is increased at the end faces of the web arms or lobes which are in flat contact against the guide disk. At this flat contact a radial weld seam is formed, preferably by laser or electron beam welding, or even condenser-discharge welding.

In a further preferred embodiment the sheet is thickened on the guide disk or the disk-shaped sheet component, which has apertures for receiving the web arms or lobes. For this type of connection between the web and guide disk it is preferable to form an axial seam by laser or electron beam welding.

According to the invention, the first process step is to prepare the second sheet component, in particular the web, by providing surplus material in the axial direction, i.e. the cylinder shell shaped area of the second sheet component, or web lobe, is extended in the axial direction relative to its finished dimension. In the second process step the surplus material is deformed by shearing and compressing, whereby the increased sheet thickness, i.e. added material, is produced in the radial direction.

In a preferred embodiment the compressing does not take place over the entire face of the surplus material, but only partially, i.e. either radially on the inside or radially on the outside, or both inside and outside. The area of the surplus material that is not compressed is isolated by shearing, so that a material projection remains, which is finally removed preferably by machining. The advantage of partial compression is that only relatively small deforming forces have to be applied, so that the loading of the first sheet metal component or web is also small and no undesired distortion (shape deviations) are produced.

In a last process step the two sheet metal components are joined, the thickened areas coming into abutting contact with the disk-shaped sheet metal component, where the radial weld seam is formed. The depth of the radial weld seam, i.e. its radial extension, in this case corresponds to the increased sheet thickness, also referred to as the thickening.

According to the invention, the device is suitable for implementing the process, i.e. for producing the increased sheet thickness by shearing and compressing. The device comprises a first tool which can be closed in the axial direction and has a flat surface in which a recess is formed. Preferably, in the plane of the flat face the recess is delimited by at least one shearing edge. When the tool is axially closed, the shearing edge encounters the surplus material and shears it over the stroke path of the axial closing. At the same time the material is compressed by the flat surface of the tool, and deformed in such manner that the material is thickened, a so-termed thickening being produced.

According to a further preferred embodiment the device comprises a second, fixed tool which holds and supports the first sheet metal component and which acts as a die shape (final shape) into which the displaced part of the surplus material can flow. Thus, there is no free compressing, but rather, compressing against a solid shape which defines the dimensions of the thickening.

According to the invention, first of all the first sheet metal component, formed as a disk or guide disk with constant sheet thickness s, is prepared. Then, in the area of the apertures the sheet metal component is pre-embossed, producing a thickening of the sheet metal component, i.e. an increased sheet thickness. This embossing can be produced by two rams with an appropriate profile which can be moved together in axially opposite directions. After the pre-embossing, the apertures are formed by stamping out. Finally, the first and second sheet metal components can be joined by engaging the arms or lobes of the web in the apertures and forming axial weld seams.

Depending on the loading of the weld joint, at each aperture a radially inner or radially outer axial seam or two axial seams can be provided in the area of the thickened portions.

BRIEF DESCRIPTION OF THE INVENTION

Example embodiments of the invention are illustrated in the drawing and will be described in more detail below, so that from the description and/or the drawings further features and/or advantages may emerge. The drawings show:

FIG. 1: A planetary carrier of the prior art, with a radial weld seam,

FIG. 2: Another planetary carrier of the prior art,

FIG. 3: A web according to the invention, with a thickened weld seam area on both sides, FIG. 4: A web with a weld seam thickened on one side (the outside), FIG. 5: A web with a weld seam thickened on one side (the inside), FIG. 6: The web of FIG. 3 with forming tools, FIG. 7: The web of FIG. 4 with forming tools, FIG. 8: The web of FIG. 5 with forming tools, FIG. 9: A planetary carrier of the prior art, with an axial weld seam, FIG. 9a: A section through plane 9A-9A in FIG. 9, FIG. 10: A planetary carrier according to the invention, with thickening and an axial weld seam on the outside, FIG. 10a: A section through plane 10A-10A in FIG. 10, FIG. 11: A planetary carrier according to the invention, with an axial weld seam (on the inside), FIG. 11a: A section through plane 11A-11A, FIG. 12: A planetary carrier according to the invention, with a guide disk thickened on the one side (the outside), FIG. 12a: A section through plane 12A-12A, FIG. 13: A planetary carrier according to the invention, with a guide disk thickened on one side (the inside), FIG. 13a: A section through plane 13A-13A, FIG. 14: A planetary carrier according to the invention, with an axial weld seam and a thickened guide disk, FIG. 15: A partial section in the area of a thickened guide disk as in FIG. 10 or 11, FIG. 15a: A partial view of the thickened area, FIG. 16: An intermediate step in the production of the thickened portion, FIG. 16a: A partial view of the thickened area, FIG. 17: A partial section through a guide disk thickened on one side as in FIG. 12, FIG. 17a: A partial view of the thickened area, FIG. 18: An intermediate step in the production of the thickened area as in FIG. 17, FIG. 18a: A partial view of the thickened area, FIG. 19: A partial section of the guide disk thickened on one side as in FIG. 13, FIG. 19a: A partial view of the thickened area, FIG. 20: An intermediate step in the production of the thickened area as in FIG. 19, and FIG. 20a: A partial view of the thickened area.

DETAILED DESCRIPTION OF THE DRAWINGS

FIG. 1 shows a half-sectioned planetary gear carrier 1 of the prior art, with the dot-dash line a representing the central and rotational axis. The planetary gear carrier 1, which in a rotary or planetary transmission serves to hold planetary gearwheels (not shown), comprises a web 2 of pot-shaped form and a guide disk 3, both these components being made of steel sheet metal. As is known from the prior art, the web 2 has three or four web arms or lobes, indexed 2a in FIG. 1. The web lobe 2a is connected in a merged-material manner to the guide disk 3 by a weld seam 4 in the form of a radial seam. The web 2 with its web lobes 2a, produced by deformation, has a constant sheet thickness s. The maximum possible extension of the radial weld seam is the full thickness s of the sheet. The depth of the weld seam 4, i.e. its radial extension, determines and limits the forces that can be transmitted in the weld seam. The radial weld seam 4 shown here is made by laser beam or electron beam welding.

FIG. 2 shows a similar example embodiment of a known planetary gear carrier 1, which comprises a web 2' with web lobes 2a' and a guide disk 3'. Again, the web 2' and web lobes 2a' have constant sheet thickness s. The web lobe 2a' is connected to the guide disk by a radial weld seam 5 formed by condenser-discharge welding. Here too, the width of the weld seam corresponds to the sheet thickness s. The width of the weld seam 5, i.e. its radial extension, is decisive for the forces that can be transmitted in the weld seam.

FIG. 3 shows a first example embodiment of the present invention for a web 10 with web lobes 11, which have at their ends a thickened area 12 on both sides. Relative to the rotation axis a the thickening 12 consists of a thickened portion 12a directed radially inward and a thickened portion 12b directly radially outward. Between these two thickened portions 12a, 12b is a material projection 12c, which is produced as a result of the deformation process described in detail below.

Whereas the web 10 and the web lobe 11 have a constant sheet thickness s, the thickened area 12 has a greater sheet thickness S such that S>s. Before the web 10 is welded onto a guide disk (not shown here), the material projection 12c is removed, preferably by machining. By virtue of the thickened area 12 the guide disk and web can be joined by a deeper weld seam, which can therefore withstand more loading. The thickened portion extends only over the area close to the weld seam, so the weight of the planetary carrier is increased only by a small amount. Its moment of inertia is also hardly any greater. The thickened area is neutral in terms of structural space, i.e. the planetary carrier equipped with the thickened web 10 takes up no more depth in the axial direction than in the prior art outlined earlier.

FIG. 4 shows a further example embodiment of the invention for a web lobe 13 with a thickened area 14 at the end and a material projection 14a. The thickened area has a sheet thickness S larger than the rest of the sheet thickness s of the web lobe 13. In contrast to the proceeding example embodiment, the end of the web lobe 13 is thickened by deformation only on the radially outer side.

FIG. 5 shows another example embodiment of the invention for a web lobe 15 with a thickened area 16, which is directed radially inward (relative to the rotation axis a) and has an increased sheet thickness S larger than the sheet thickness s of the rest of the web lobe 15. The material projection 16a remaining after deformation is then removed. The dot-dash line across the end face of the web lobe 15 indicates the contour without thickening according to the invention.

FIG. 6 illustrates the production of the example embodiment in FIG. 3, so the same indexes are used for the same parts. The web lobe 11 is held and supported in a two-part tool 17a, 17b indicated by shading, the tool 17a, 17b having in the area of the thickening 12 a corresponding hollow shape into which the material can be forced during deformation. A second, mobile tool 18 comprising two tool halves 18a, 18b acts as a ram and is closed down onto the clamped web lobe 11 in the direction of the arrow Z. The tool 18 has a central recess 20 delimited at the front by two shearing edges 19a, 19b. The illustration of FIG. 6 shows the web lobe 11 with its thickened portion 12 after deformation. The tool 18 is already in its retracted position. Before the deformation, the web lobe has some surplus material (not shown) in the axial direction (axis a), of length corresponding approximately to that of the material projection 12c. At the beginning of the deformation process the tool 18 is pushed inward, in the direction of the arrow Z, whereby the shearing edges 19a, 19b cut into the added material, shearing it, and at the same time compressing it in the direction of the arrow Z. The compressed material is thus displaced outward into the cavity of the tool 17a, 17b. The tool 18 is closed in until it stops against the tool 17a, 17b, and is then retracted. As already mentioned earlier, after the deformation the material projection 12c is removed. The web 10 with its web lobe 11 is then ready to be welded to the guide disk.

FIG. 7 shows the production of the thickened area 14 in the example embodiment of FIG. 4 by deformation—using the same indexes as in FIG. 4. The web lobe 13 is held and clamped in a fixed, two-part tool 21, 22, such that the lower tool in the drawing has a recess for the thickened portion 14. A mobile tool 23 that can be brought inward, in the direction of the arrow Z, has a shearing edge 23a and a recess 23b. Before deformation, the web lobe 13 has some surplus material (not shown) extending in the axial direction (a) as far as the dimension ü of the material projection 14a. The deformation takes place by closing in the mobile tool 23 in the direction Z until the shearing edge 23a cuts into the added material, shearing and at the same time compressing it until the material has been forced into the recess of the tool 22. The finally deformed web lobe 13 then has a thickened area 14 radially on the outside. Thus, the end surface of the web lobe 13 with the added material is only partially compressed, with the advantage that only relatively small deformation forces in the Z direction are needed. The surplus material 14a must be removed before welding so that a smooth face is obtained for the weld joint of the web lobe 13 onto the guide disk (not shown).

FIG. 8 shows the production by deformation of the example embodiment according to FIG. 5, i.e. the web lobe 15 with a radially inner thickened portion 16. The web lobe 15 is held and clamped in a fixed, two-part tool 24, 25, the radially inner tool 24 having a recess that corresponds to the thickened portion 16. A mobile tool 26 has a shearing edge 26a and a recess 26b at the front. The closing and deformation process again takes place in the direction of the arrow Z. Owing to the design of the tools 24, 25, 26 the surplus material at the end is displaced radially inward and forms the thickened area 16. The residual material projection 16a produced because of the recess 26b in the tool 26 is then removed.

The form of the tools described above can be modified. The essential feature is, on the one hand, that the end surface is only partially compressed, either on both sides or on one side only, which reduces the deformation forces. On the other hand, the fixed tool has one or two calibrated recesses so that the thickened area reaches the same final size in each case.

FIG. 9 shows a half-section of a known planetary carrier 30, which has a web 31 and a guide disk 32 with material thickness s. The web 31 is in the shape of a star and has around its circumference three or more web arms or web lobes 31a which are connected to the guide disk 32 by an axial weld seam 33.

FIG. 9a shows a section through the web lobe 31a in the plane 9A-9A looking toward the guide disk 32, which has a kidney-shaped aperture 32a. At its end the web lobe 31a is inserted into the aperture 32a and connected to the guide disk 32 by the axial weld seam 33. This fixing mode according to the prior art is an alternative to the radial weld seams of FIG. 1 and FIG. 2. The depth of the weld seam 33 corresponds to the material thickness s of the guide disk 32, which therefore determines the maximum depth of the weld seam 32 and hence the size of the torque of the planetary carrier 30 that can be transmitted by the weld seam 33.

FIGS. 10 and 10a show a planetary carrier 34 according to the invention, which comprises a web 35 with web lobes 35a and a guide disk 36 with material thickness s. Both components 35, 36 are made from steel sheet metal and are joined by welding. The guide disk 36 has a kidney-shaped aperture 37 which receives the front end of the web lobe 35a. According to the invention, in the area of the aperture 37 the guide disk 36 is thickened on the radially inner and radially outer sides by deformation, and has a radially inner thickened area 38a and a radially outer thickened area 38b. This produces an increased sheet thickness S>s in the area of the aperture 37. In the area of the aperture 37 the web lobe 35a is joined by an axial weld seam 39 to the guide disk 36. Owing to the thickened area 38b the weld seam 39 has a maximum depth S, which is greater than the material thickness s of the guide disk 36. Thus, the axial weld seam 39 can withstand higher loads.

FIGS. 11 and 11a show an example embodiment of the planetary carrier 34 in FIG. 10 which is modified as regards the weld, the same indexes as in FIG. 10 being used for the same parts. In this case the axial weld seam 40 is positioned radially on the inside, i.e. in the area of the radially inner thickened area 38a. In this case too the axial weld seam 40 has a depth increased to S compared with the material thickness s of the guide disk 36.

FIGS. 12 and 12a show a further example embodiment of the invention for a guide disk 41 thickened on one side, with an aperture 42 that receives the front end of a web lobe 43. On the radially outer side of the aperture 42 relative to the rotational axis a is formed a thickened area 44 with sheet thickness S larger than the sheet thickness s of the guide disk 41. In the area of the thickened portion 44 is formed an axial weld seam 45, whose width is also S.

FIGS. 13 and 13a show a modification of the example embodiment in FIG. 12: in a guide disk 46 with an aperture 47 a thickened area 48 is formed on the radially inner side. An axial weld seam 49 connects the guide disk 46 to a web lobe 50 inserted into the aperture 47. The axial weld seam 49 had a depth corresponding to the greater sheet thickness S.

FIG. 14 shows a modified example embodiment of the invention for a guide disk 51 with sheet thickness s. The guide disk 51 has an aperture 52 which holds the end of a web lobe 53. On each side, i.e. on the radially inner and outer sides the aperture 52 has respective thickened areas 54a, 54b of greater sheet thickness S>s. An axial weld seam 55 connects the web lobe 53 to the guide disk 51. The thick portions 54a, 54b are arranged on the outside of the guide disk 51 (on the right side in the drawing), and to that extent the planetary carrier takes up slightly more space in the axial direction (axis a). This embodiment can be modified in the same way as the previous embodiments in FIGS. 12 and 13, i.e. with only one thickened area respectively positioned radially inside or radially outside the aperture 52. The same applies to the position of the axial weld seam 55.

Figure 15:
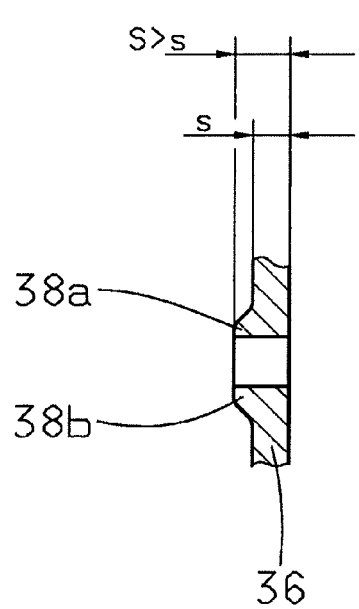
FIG. 15 shows an enlarged representation of the guide disk 36 in the example embodiment shown in FIG. 10, with thickened areas 38a, 38b on both sides.
Figure 15A:
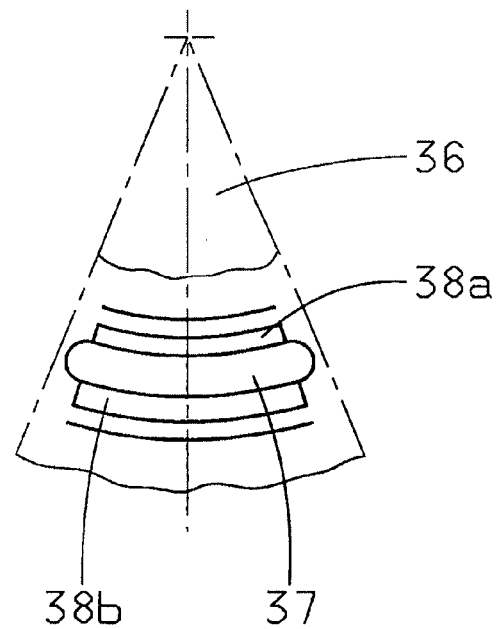
FIG. 15a shows a view in the axial direction toward the guide disk 36 with its aperture 37.
Figure 16:
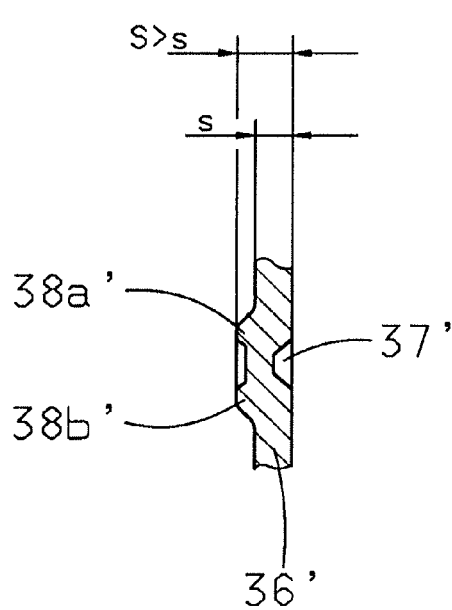
Figure 16A:
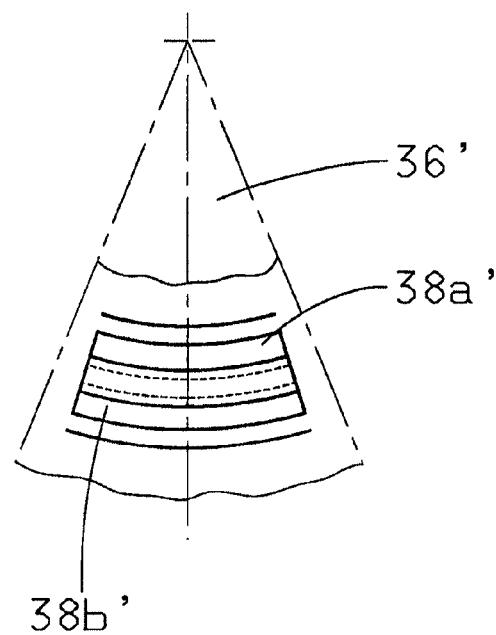

FIGS. 16 and 16a show a pre-embossed guide disk 36' produced as a preliminary step in a deformation process for producing the guide disk 36 in FIG. 15. The starting material is a smooth guide disk with sheet thickness s. This is shaped by two stamping tools (not shown) acting in opposition, in such manner that on one side an indentation 37' and on the other side two protuberances 38a', 38b' are produced, by virtue of which the sheet thickness is increased to S. In a further process step the aperture 37 is then stamped out.

Figure 6:
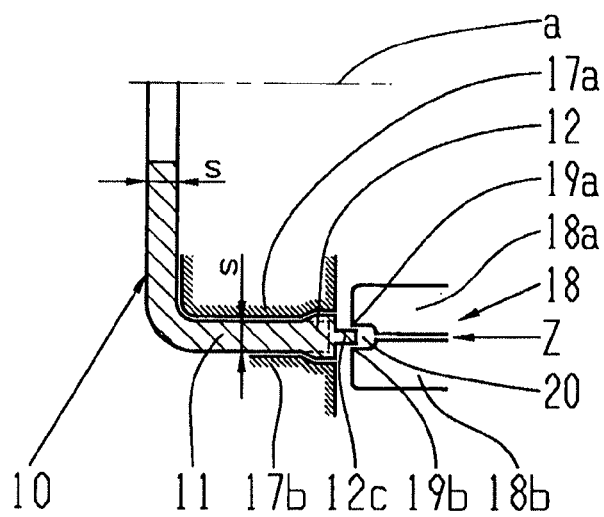
Figure 7:
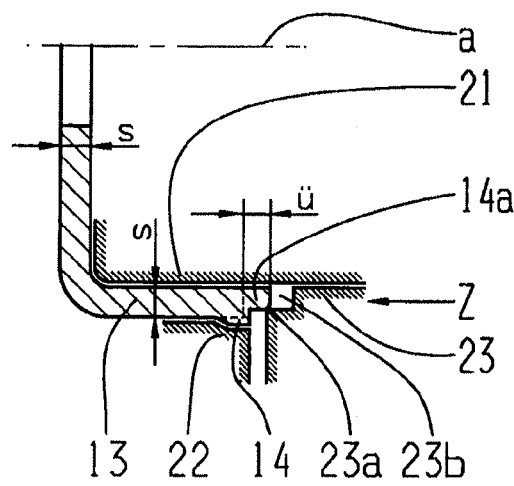
Figure 8:
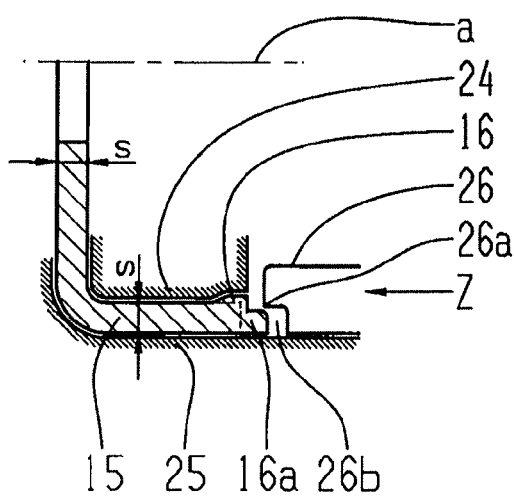
Figure 10:
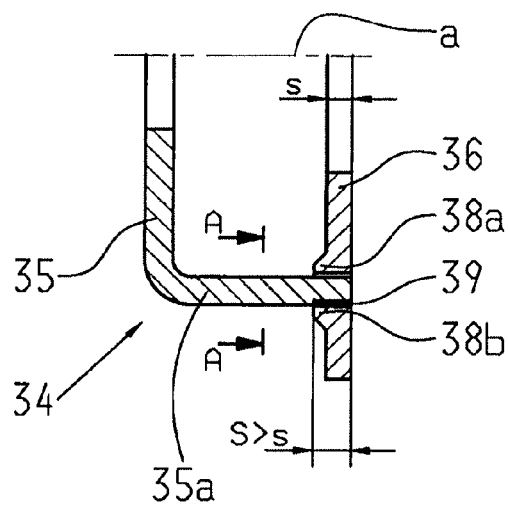
Figure 10A:
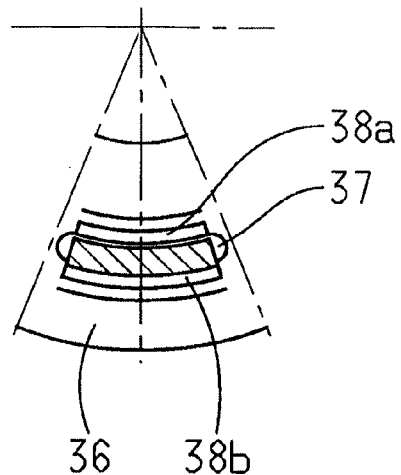
Figure 11:
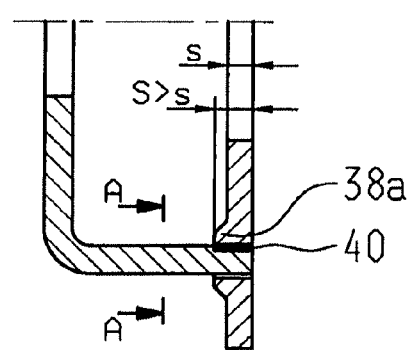
Figure 11A:
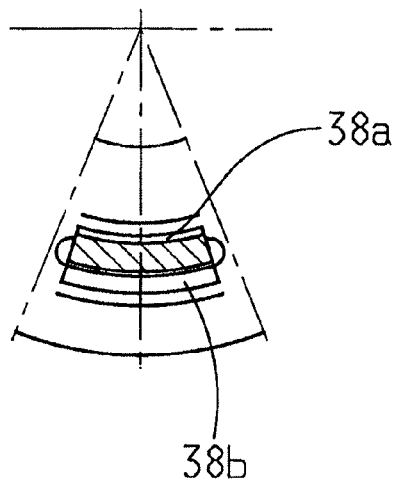
Figure 12:
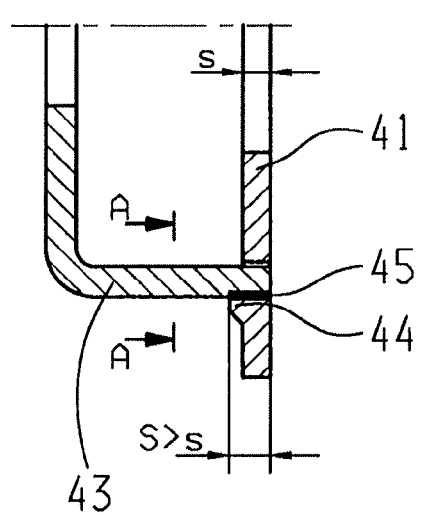
Figure 12A:
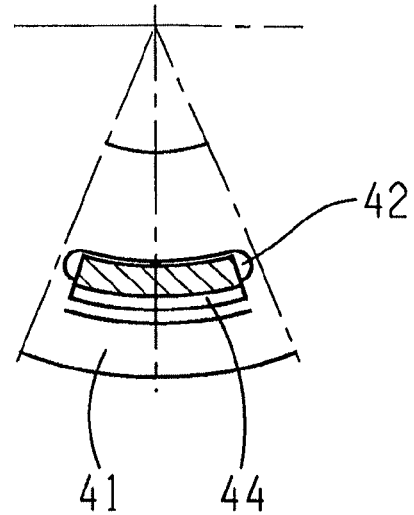
Figure 17:
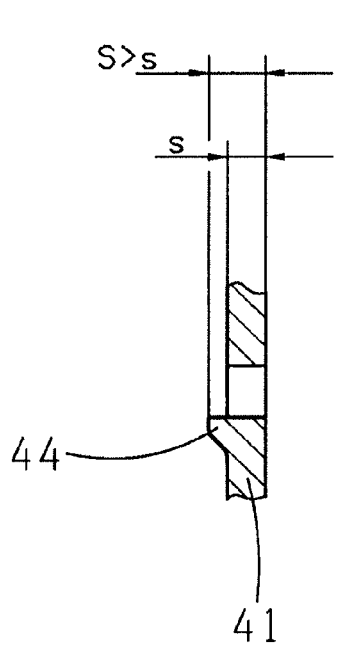
Figure 17A:
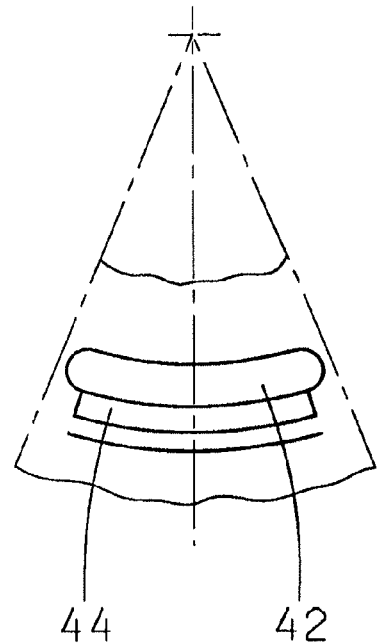

FIG. 17 shows an enlarged view of the guide disk 41 of the example embodiment shown in FIG. 12, with a thickened area 44 on one side.

Figure 18:
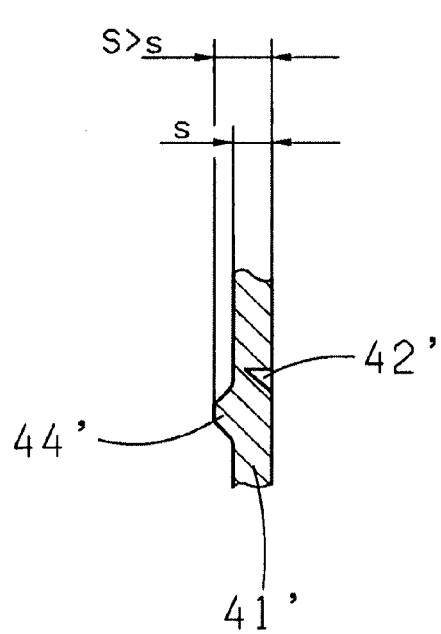
Figure 18A:
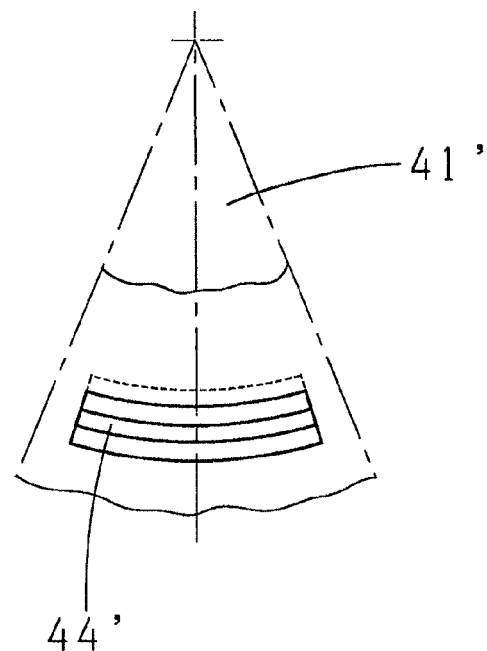

FIGS. 18 and 18a show a deformation process for producing the guide disk 41 as a pre-formed guide disk 41'. From the smooth guide disk with a constant sheet thickness s a pre-embossed disk 41' with indentation 42' on one side and a protuberance 44' on the other side is produced. In the area of the protuberance 44' the guide disk 41' has greater sheet thickness S>s.

Figure 13:
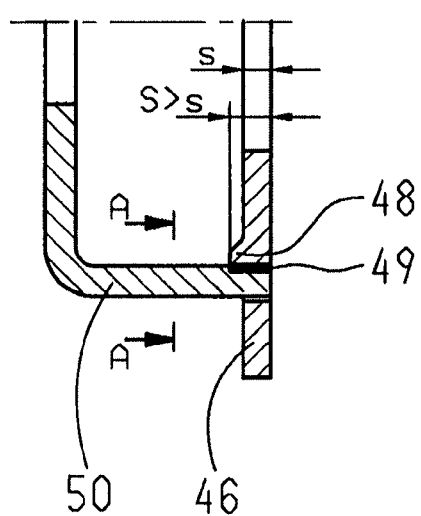
Figure 13A:
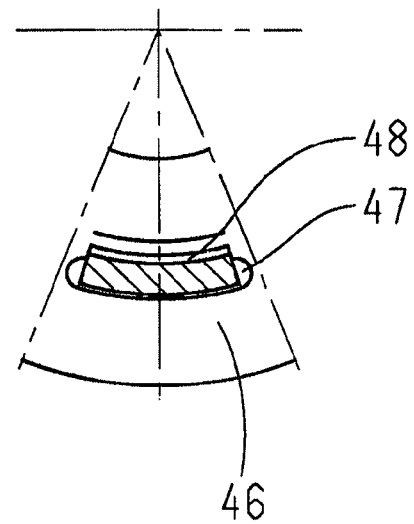

FIGS. 19 and 19a show the guide disk of the example embodiment in FIG. 13, with a radially inner thickened area 48, in an enlarged representation as an individual component.

FIGS. 20 and 20a show a pre-formed guide disk 46 after a first step of a deformation process. Analogously to the previous example embodiment in FIG. 18, after the first deformation step there is indentation 47' on one side and a protuberance 48' on the other side. Due to the protuberance 48' the sheet thickness is increased to S>s. In a second process step the aperture 47' is stamped out, to obtain the guide disk 46 according to FIG. 19.

In the example embodiments mentioned above, in each case a welded planetary carrier comprising a web and a guide disk was described. Having regard to the scope of the invention it must be made clear that the planetary carrier is only one particular embodiment of a welded component, and the web and guide disk are example embodiments, respectively, of a pot or crown-shaped sheet metal component and of a disk-shaped sheet component.

INDEXES 1, 1' Planetary carrier
2, 2' Web
2a, 2a' Web lobes
3, 3' Guide disk
4 Weld seam
5 Weld seam
10 Web
11 Web lobe
12 Thickening
12a Inner thickened portion
12b Outer thickened portion
12c Material projection
13 Web lobe
14 Thickening
14a Material projection
15 Web lobe
16 Thickening
16a Material projection
17a Inner tool
17b Outer tool
18 Mobile tool
18a Tool half
18b Tool half
19a Shearing edge
19b Shearing edge
20 Recess
21 Fixed tool
22 Fixed tool
23 Mobile tool
23a Shearing edge
23b Recess
24 Fixed tool
25 Fixed tool
26 Mobile tool
26a Shearing edge
26b Recess
30 Planetary carrier
31 Web
31a Web lobe
32 Guide disk
32a Aperture
33 Axial weld seam
34 Planetary carrier
35 Web
35a Web lobe
36 Guide disk
37 Aperture
38a, 38a' Inner thickened portion
38b, 38b' Outer thickened portion
39 Axial weld seam, outside
40 Axial weld seam, inside
41 Guide disk
42 Aperture
43 Web lobe
44, 44' Thickening
45 Axial weld seam 46 Guide disk
47 Aperture
48, 48' Thickening
49 Axial weld seam
50 Web lobe
51 Guide disk
52 Aperture
53 Web lobe
54a Inner thickened portion
54b Outer thickened portion
55 Axial weld seam

The invention claimed is:

1. A welded component (1, 30) comprising:
first and second sheet metal components (2, 3, 31, 32), the first and the second sheet metal components are connected to each other by at least one weld seam (4, 33), the first sheet metal component (32) being disk-shaped and defining an axis (a) and the second sheet metal component (31) being pot-shaped,
at least one of the first and the second sheet metal components (2, 3) having a nominal sheet thickness (s), and
one (11, 13, 15; 36, 41, 46, 51) of the first and the second sheet component being prepared, with a first tool that is closable in an axial direction and has an end face with a recess, to have surplus material in an axial direction so as to have an increased sheet thickness (S>s) in an area of the at least one weld seam (39, 40, 45, 49, 55).

2. The component according to claim 1, wherein the increased sheet thickness (S) is produced by deforming the second sheet metal component (11, 13, 15, 36, 41, 46, 51).

3. The component according to claim 1, wherein the welded component is a planetary carrier (10, 34) of a transmission, the first disk-shaped sheet metal component (36, 41, 46, 51) is a guide disk, and the second pot-shaped sheet metal component (10, 35, 43, 50, 53) is a web.

4. The component according to claim 1, wherein the at least one weld seam, which connects the first and the second sheet metal components, is a radial weld seam (4).

5. The component according to claim 4, wherein the increased sheet thickness (S) is produced in the pot-shaped sheet metal component (10, 13, 15).

6. The component according to claim 1, wherein the at least one weld seam, which connects the first and the second sheet metal components, is an axial weld seam (39, 40, 45, 49, 55).

7. The component according to claim 6, wherein the first sheet metal component comprises two portions, a first portion of the first sheet metal component has a nominal sheet thickness and second portions of the first sheet metal component has an increased sheet thickness (S) that is greater than the nominal sheet thickness, the second sheet metal component is fixed to the second portions of the first sheet metal component.

8. The component according to claim 7, wherein the second portions of the first sheet metal component are distributed around a circumference thereof each of the second portions of the first sheet metal component comprises an aperture, remote ends of the second sheet metal component are received within the apertures and engage the second portions of the first sheet metal component such that the remote ends contact the first sheet metal component over a distance that is greater than the nominal sheet thickness.

9. The component according to claim 8, wherein the at least one axial weld seam (39, 40, 45, 49, 55) is arranged in an area of the apertures (37, 42, 47).

10. A method for producing a welded component comprising first and second sheet metal components (2, 3, 31, 32) joined by at least one weld seam (4, 33), the first sheet metal component (32) is disk-shaped and the second sheet metal component (31) is pot-shaped and at least one of the first and the second sheet metal components (2, 3) has a nominal sheet thickness (s), one (11, 13, 15; 36, 41, 46, 51) of the first and the second sheet components has an increased sheet thickness (S>s) in an area of the at least one weld seam (39, 40, 45, 49, 55), and the method comprising the steps of:
preparing the second, pot-shaped sheet metal component or a web (11, 13, 15) with surplus material in an axial direction;
shearing and compressing the surplus material in the axial direction (a); and
forming the increased sheet thickness (S).

11. The method according to claim 10, further comprising the step of partially compressing the surplus material in at least one outer area.

12. The method according to claim 10, further comprising the step of removing a material projection (12c, 14a, 16a) remaining after deformation.

13. The method for producing the component according to claim 10, further comprising the steps of:
preparing either the first disk-shaped sheet metal component or a guide disk (36, 41, 46) having a constant sheet thickness (s),
pre-embossing the first disk-shaped sheet metal component to form the increased sheet thickness (S),
stamping out apertures (37, 42, 47) in the guide disk (36, 41, 46, 51), the apertures (37, 42, 47, 52) being distributed around a circumference of the guide disk (36, 41, 46, 51), and
joining the first and the second sheet metal components (35, 36, 41, 43, 50, 51, 53) and forming the axial weld seam (39, 40, 45, 49, 55).

14. A device for implementing a method for producing a welded component comprising first and second sheet metal components (2, 3, 31, 32) that are joined by at least one weld seam (4, 33), the first sheet metal component (32) being disk-shaped and the second sheet metal component (31) being pot-shaped and at least one of the first and the second sheet metal components (2, 3) having a nominal sheet thickness (s), one (11, 13, 15; 36, 41, 46, 51) of the first and the second sheet components having an increased sheet thickness (S>s) in an area of the at least one weld seam (39, 40, 45, 49, 55), the second, pot-shaped sheet metal component or a web (11, 13, 15) is prepared with surplus material in an axial direction;
the increased sheet thickness (S) being formed by a first tool (18, 18a, 18b, 23, 26) that is closable in the axial direction (Z) and has a recess (20, 23b, 26b) in its end face; and
the increased sheet thickness of the second sheet components is formed by compressing a part of the second sheet component with a second fixed tool (17a, 17b, 21, 22, 24, 25), which holds either the pot-shaped sheet component or the web (11, 13, 15), has an end shaped for accommodating part (12, 14, 16) of the second sheet component (11, 13, 15) that is to be compressed.

15. The device according to claim 14, wherein a leading end of the second sheet metal component comprises a projection that has a shorter sheet thickness that is less than the nominal sheet thickness of the second sheet metal component, the projection being formed by the recess in the end face of the first tool, the recess (20, 23b, 26b) is delimited by at least one shearing edge (19a, 19b, 23a, 26a).

* * * * *